(12) United States Patent
Milby

(10) Patent No.: US 6,938,044 B1
(45) Date of Patent: Aug. 30, 2005

(54) TRACKING USAGE OF RESOURCES OF A DATABASE SYSTEM

(75) Inventor: Gregory H. Milby, San Marcos, CA (US)

(73) Assignee: NCR Corporation, Dayton, OH (US)

( * ) Notice: Subject to any disclaimer, the term of this patent is extended or adjusted under 35 U.S.C. 154(b) by 472 days.

(21) Appl. No.: 10/035,742

(22) Filed: Dec. 28, 2001

(51) Int. Cl.[7] ............................................ G06F 17/30
(52) U.S. Cl. .......................................... 707/100; 707/3
(58) Field of Search ................................ 707/1–5, 100; 704/10; 715/532

(56) References Cited

U.S. PATENT DOCUMENTS

| | | | |
|---|---|---|---|
| 5,640,584 A | 6/1997 | Kandasamy et al. ............ 712/30 |
| 5,864,842 A | 1/1999 | Pederson et al. ................ 707/3 |
| 5,872,904 A | 2/1999 | McMillen et al. .............. 714/4 |
| 5,884,299 A | 3/1999 | Ramesh et al. ................. 707/2 |
| 5,940,835 A * | 8/1999 | Sit ............................... 707/102 |
| 6,209,000 B1 * | 3/2001 | Klein et al. ................... 707/203 |
| 6,338,056 B1 * | 1/2002 | Dessloch et al. .............. 707/2 |
| 6,366,904 B1 * | 4/2002 | BenHadda et al. ............. 707/3 |
| 6,434,554 B1 * | 8/2002 | Asami et al. ................... 707/4 |
| 6,510,419 B1 * | 1/2003 | Gatto ........................... 705/36 |
| 6,557,011 B1 * | 4/2003 | Sevitsky et al. .......... 707/104.1 |
| 6,560,593 B1 * | 5/2003 | Kosciuszko et al. ............ 707/2 |
| 6,647,384 B2 * | 11/2003 | Gilmour ......................... 707/5 |

OTHER PUBLICATIONS

Peter Gulutzan&Trudy Pelzer, "SQL-99 Complete, Really," pp. 30-33, 517-539 (1999).

* cited by examiner

*Primary Examiner*—Greta Robinson
*Assistant Examiner*—Cheryl Lewis
(74) *Attorney, Agent, or Firm*—Trop, Pruner & Hu, P.C.; Harden E. Stevens, III

(57) ABSTRACT

A database system is capable of storing data according to a user-defined data type (UDT). Usage of the user-defined data type is tracked, with an indication of the tracked usage provided to enable calculation of royalty to be paid. Optionally, usage of methods associated with the user-defined data type and/or user-defined functions is tracked. Alternatively, or in addition to, usage of other database system resources are also tracked.

40 Claims, 3 Drawing Sheets

TRACKING USAGE OF RESOURCES OF A DATABASE SYSTEM

BACKGROUND

A database is a collection of stored data that is logically related and that is accessible by one or more users or applications. A popular type of database is the relational database management system, which includes relational tables made up of rows and columns. Each row represents an occurrence of an entity defined by a table, with an entity being a person, place, or thing about which the table contains information.

To extract data from, or to update, a relational table, queries according to a standard database query language are used (e.g., Structured Query Language or SQL). One version of SQL is the SQL-92 Standard, while another version of SQL is the SQL-99 Standard (also referred to as the SQL-3 Standard).

SQL-99 defines several data types, including predefined data types and user-defined data types (UDTs). Examples of predefined data types include the number data type for representing numeric values, character string data type for representing a sequence of characters, and so forth. A characteristic of predefined SQL data types is that the inherent structure of the data type is already defined by the SQL Standard. User-defined data types, on the other hand, are not predefined; instead, user-defined data types are set by an application, a database management system, or by another standard.

With the advent of user-defined data types, more complex data objects can be stored in relational tables. Examples of complex objects include spatial data, video data, image data, audio data, formatted documents, multimedia data, and so forth. Database systems that are capable of storing complex objects in relational tables are referred to as object relational database management systems (ORDBMS). In an ORDBMS, user-defined data types enable the storage of large objects as an entry in the relational table.

For enhanced features provided by user-defined data types, further research and development are needed, both on the part of database vendors as well as third-party software developers separate from the database vendors. However, such further research and development are associated with substantial costs, which will need to be recovered by revenue generated from the sale of enhanced user-defined data type features.

SUMMARY

In general, a mechanism is provided to track usage of user-defined data types (UDTs), UDT methods, and/or user-defined functions (UDFs) for accounting purposes.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
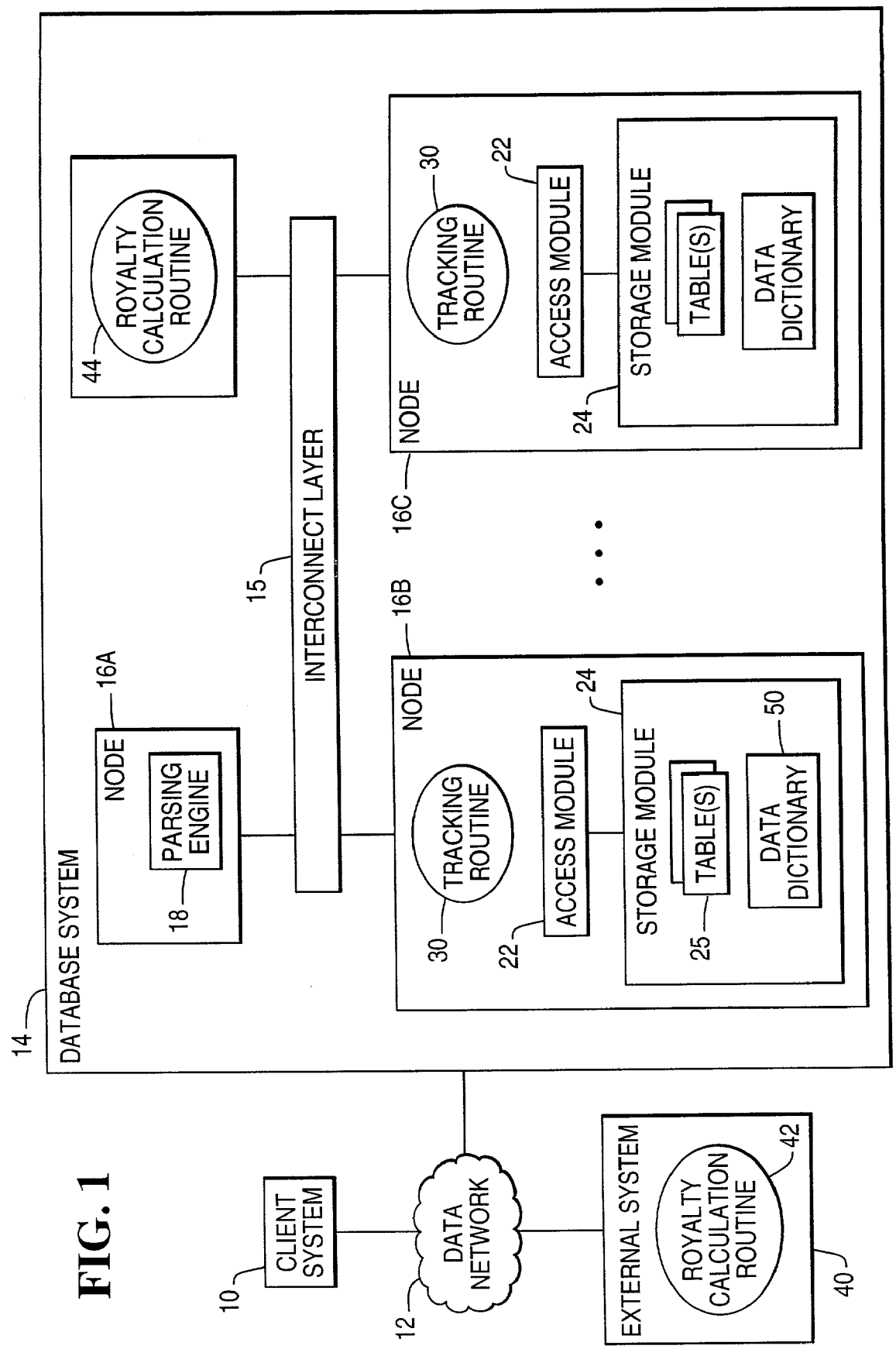
FIG. 1 is a block diagram of an example arrangement of a client system and a database system.

FIG. 1 shows an example arrangement in which a client system 10 is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth) in the database system 14. One example of the standard database query language is the Structured Query Language (SQL). SQL is provided by the American National Standards Institute (ANSI), with one version being the SQL-99 Standard (also referred to as the SQL-3 Standard). Although reference is made to SQL-99 in this discussion, other embodiments can employ other types of standard database query languages that provide for user-defined data types (UDTs).

As used here, a "UDT" refers to a data type used in the database system that can be created by a user (e.g., database vendor, third-party software developer, etc.), an application, a database management system, or another standard (other than the database query language). UDTs are contrasted with predefined or built-in data types, which have structures already defined by the standard database query language itself. In one embodiment, a UDT is implemented as a C++ class, which includes data and methods, although other mechanisms can be used in other embodiments.

SQL provides for data definition language (DDL) statements that are used to define database structures. SQL also provides for data manipulation language (DML) statements that are used to manipulate fields of a table. Examples of DML statements include SELECT, UPDATE, DELETE, and INSERT statements. Examples of DDL statements include statements to create or modify tables or views. In addition, in accordance with SQL-99, DDL statements include a CREATE TYPE statement to create a UDT, and a CREATE METHOD statement to create a method associated with a UDT (referred to as a "UDT method"). In one example, the CREATE TYPE and CREATE METHOD statements are defined by SQL-99. All such statements can be generated by the client system 10 and communicated over the data network 12 for processing by the database system 14.

In addition to UDT methods, user-defined functions (UDFs) are also optionally provided in the database system 14. In one example implementation, a UDF is a C++ function. A UDF is created by a CREATE FUNCTION statement, which creates an SQL-invoked function or routine. Thus, in the database system 14, three types of user-defined objects can be created: UDTs, built-in methods associated with the UDTs (referred to as UDT methods), and UDFs.

As use of UDTs in database systems become increasingly more prevalent, database vendors as well as third-party software developers not associated with the database vendors may wish to find new ways of generating additional revenue. Since UDTs, UDT methods, or UDFs are relatively complex (and thus expensive to develop) in some cases, it may make sense to charge a royalty based on usage of such UDTs, UDT methods, and/or UDFs. The revenue may be based on royalty paid by the user (e.g., in the form of subscription fees), or it may be based on a royalty paid by a database vendor to a third-party software developer, as examples.

To enable the collection of revenue based on usage of UDTs, UDT methods and/or UDFs, a mechanism (in the form of one or plural tracking routines 30) is provided in the database system 14 to track usage of one or more such objects (referred to generally as "user-defined objects"). As used here, user-defined objects include any one of UDTs, UDT methods, UDFs, and any other resource in the database system 14 whose usage can be tracked. Examples of other resources include tables, attributes, views, indexes, and so forth). In the ensuing description, reference is made to tracking usage of UDTs, UDT methods, or UDFs. However, similar techniques can be applied to track usage of other database system resources.

A UDT can be marked as being used every time a table is created that contains a column (or attribute) storing data according to the UDT. Usage of a UDT method is based on the number of times that the UDT method is invoked. Similarly, usage of a UDF is based on the number of times the UDF is invoked. The usage of these objects are tracked by storing indications in predetermined storage locations in the database system 14, as described further below.

Another feature offered by the database system 14 is the ability to determine if a user or application has authorization to access a UDT, UDT method, or UDF. This is accomplished by associating an authorization code with the UDT, UDT method, or UDF. Thus, before a user or application is granted access to the UDT, UDT method, or UDF, an authorization code has to be provided and checked against a predefined code associated with the object. This feature is offered by the tracking routine 30 in one embodiment, or by another routine or module in another embodiment.

According to one arrangement, the database system 14 includes a plurality of nodes 16A, 16B, and 16C that are coupled together by an interconnect layer 15. The node 16A is coupled to the network 12, and in the illustrated embodiment, includes a parsing engine or query coordinator 18. The parsing engine 18 interprets a query (such as a query received from the client system 10), checks the query for proper SQL syntax, and sends out executable actions to be performed by the nodes 16B, 16C.

Each of the nodes 16B, 16C includes one or plural access modules 22. One example of an access module 22 is the access module processor (AMP) used in some TERADATA® database systems from NCR Corporation. Each access module 22 is responsible for managing access to a respective portion of the database. As shown in FIG. 1, each access module 22 manages access to data stored in a respective storage module 24. The presence of multiple access modules enables the concurrent or parallel access and processing of multiple portions of one or more tables stored in respective storage modules 24. Although shown as discrete components, the storage module 24 may be part of the same storage subsystem, with the storage modules 24 representing different partitions of the storage subsystem. Alternatively, the storage modules 24 are implemented with separate storage devices.

Each storage module 24 stores one or more tables 25. Because the database system 14 shown in FIG. 1 is a parallel database system that enables concurrent access of different portions of a table, the tables 25 are distributed among plural storage modules 24, as shown in FIG. 1. Each table 25 is thus said to be distributed across multiple access modules 22, with data in the respective portions of the table accessed by corresponding access modules.

In a different embodiment, instead of having multiple nodes, the parallel database system is implemented as a single-node, multiprocessing system that has plural processors. In yet another embodiment, a uni-processor database system is used.

In accordance with one embodiment of the invention, keywords are included in the CREATE TYPE DDL directive or statement, CREATE METHOD DDL directive, and CREATE FUNCTION DDL directive to enable the accounting function and/or the authorization function. For example, a first keyword is included in the CREATE directives to enable the accounting mechanism. In one example, the first keyword is ACTIVATE_ACCOUNTING. Using the ACTIVATE_ACCOUNTING keyword in a CREATE TYPE statement signifies that usage of the UDT created by the statement is to be tracked. To also turn on tracking of methods associated with the UDT, an alternative keyword, e.g., ACTIVATE_ACCOUNTING_ALL, is included in the CREATE TYPE statement.

To activate accounting for an individual UDT method, the keyword ACTIVATE_ACCOUNTING is included in a CREATE METHOD directive. To activate accounting for a function, the keyword ACTIVATE_ACCOUNTING keyword is included in a CREATE FUNCTION directive.

Example statements are provided below:
CREATE TYPE MyType1 . . . SQL-99 Fields . . . ACTIVATE_ACCOUNTING;
CREATE TYPE MyType1 . . . SQL-99 Fields . . . ACTIVATE_ACCOUNTING_ALL;
CREATE METHOD MyMethod1 . . . SQL-99 Fields . . . ACTIVATE_ACCOUNTING;
CREATE FUNCTION MyFunction1 . . . SQL-99 Fields . . . ACTIVATE_ACCOUNTING;

The first statement creates the UDT MyType1, with the ACTIVATE_ACCOUNTING keyword provided to enable tracking of the MyType1 UDT. The second statement is the same as the first statement, except the ACTIVATE_ACCOUNTING_ALL keyword is used to enable tracking of the MyType1 UDT as well as UDT methods associated with the MyType1 UDT.

The third statement creates a UDT method MyMethod1, with the ACTIVATE_ACCOUNTING keyword provided to enable tracking of the MyMethod1 method. The fourth statement creates a UDF MyFunction1, with the ACTIVATE_ACCOUNTING keyword provided to enable tracking of the MyFunction1 function.

In systems that enable the verification of access by using an authorization code, another keyword can be used to turn on the authorization mechanism for one or more of a UDT, UDT method, or UDF. In one example, this authorization keyword is PRODUCT_KEY. Example statements are provided below:
CREATE TYPE MyType1 . . . SQL-99 Fields. PRODUCT_KEY CZ3370000999843;
CREATE METHOD MyMethod1 . . . SQL-99 Fields. PRODUCT_KEY MR35000888451;
CREATE FUNCTION MyFunction1 . . . SQL-99 Fields. PRODUCT_KEY 5554189213;

The first statement creates the MyType1 UDT, which includes the authorization code PRODUCT_KEY CZ3370000999843. The second statement creates the MyMethod1 UDT method with PRODUCT_KEY MR35000888451. The third statement creates the MyFunction1 UDF with PRODUCT_KEY 5554189213. A user or application that desires to access the UDT, UDT method, or UDF must provide an authorization code (in the form of a parameter and the like) that matches the respective PRODUCT_KEY keyword.

In another example, the ACTIVATE_ACCOUNTING and PRODUCT_KEY keywords can be used concurrently as in the statements below:

CREATE TYPE MyType1 . . . SQL-99 Fields. ACTIVATE_ACCOUNTING PRODUCT_KEY CZ3370000999843;

CREATE METHOD MyMethod1 . . . SQL-99 Fields. ACTIVATE_ACCOUNTING PRODUCT_KEY MR35000888451;

CREATE FUNCTION MyFunction1 . . . SQL-99 Fields . . . ACTIVATE_ACCOUNTING PRODUCT_KEY 5554189213;

Note that the above describes one example of turning on the accounting and security features. Other embodiments can use other mechanisms to turn on the accounting and security features.

Figure 2:
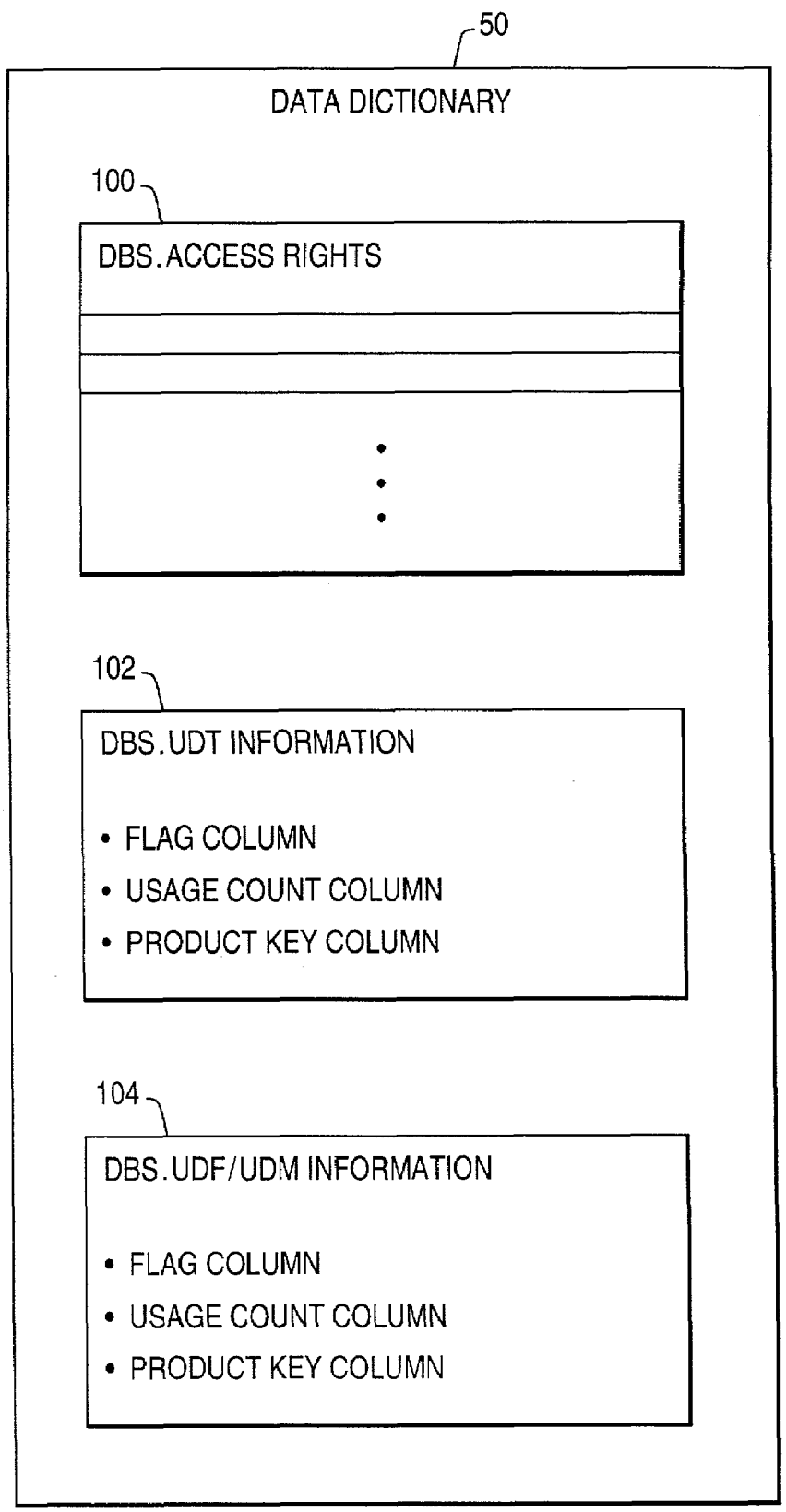
FIG. 2 illustrates a portion of a data dictionary stored in the database system of FIG. 1.

As shown in FIG. 2, for tracking and security purposes, a data dictionary 50 in the database system 14 contains the following tables: DBS.AccessRights 100; DBS.UDTInformation 102; and DBS.UDF/UDMInformation 104. Information contained in the data dictionary 50 is "data about data" or "metadata." Examples of information contained in the data dictionary 50 include information pertaining to characteristics of each table in the database, including column names, the data type for each column, the primary key, and indexes defined on each table. Other information includes information pertaining to whether fallback is used, the owner of the table, the creator of the table, associated privileges per user, journaling definitions for rollback/rollforward-type operations, and so forth.

The DBS.AccessRights table 100 in the data dictionary 50 stores information pertaining to access rights granted on UDTs, UDT methods, and UDFs (or other resources in the database system). The DBS.UDTInformation table 102 contains information about UDTs in the database system 14. The table 102 includes plural rows, with each row containing information relating to a respective UDT. Further, in accordance with some embodiments of the invention, the UDTInformation table 102 includes a Flag column that contains values indicating whether, for a given UDT, the ACTIVATE_ACCOUNTING keyword is set or the ACTIVATE_ACCOUNTING_ALL keyword is set. The UDTInformation table 102 also includes a Usage Count column to indicate the number of times that a given UDT has been used in the database system 14. The UDTInformation table 102 also includes a Product Key column that stores the authorization keyword for each UDT.

The UDF/UDMInformation table 104 contains information pertaining to various UDFs and UDT methods in the database system 14. In another embodiment, instead of only one table for both UDFs and UDT methods, separate tables are used, one for UDFs and the other for UDT methods. The UDF/UDMInformation table 104 contains a Flag column to indicate whether the ACTIVATE_ACCOUNTING keyword is set, a Usage Count column to indicate the number of times the UDF and/or UDT method has been invoked, and a Product Key column storing an authorization keyword associated with the UDF and/or UDT method.

In other embodiments, other tables are present in the data dictionary 50 to store Flag fields, Usage Count fields, and Product Key fields for other resources in the database system 14. Also, in alternative embodiments, the Flag, Usage Count, and Product Key fields for any of the resources are stored in a storage location separate from the data dictionary 50.

Once accounting has been activated using the CREATE TYPE, CREATE METHOD, and/or CREATE FUNCTION statements discussed above, usage tracking is performed as follows. For tracking UDT usage, the Usage Count field in the UDTInformation table 102 is incremented each time a CREATE TABLE DDL statement is entered that contains an attribute according to the tracked UDT. For tracking UDF and/or UDT method usage, the Usage Count field in the UDF/UDMInformation table 104 is incremented each time a DML statement is issued containing the UDF and/or UDT method.

Figure 3:
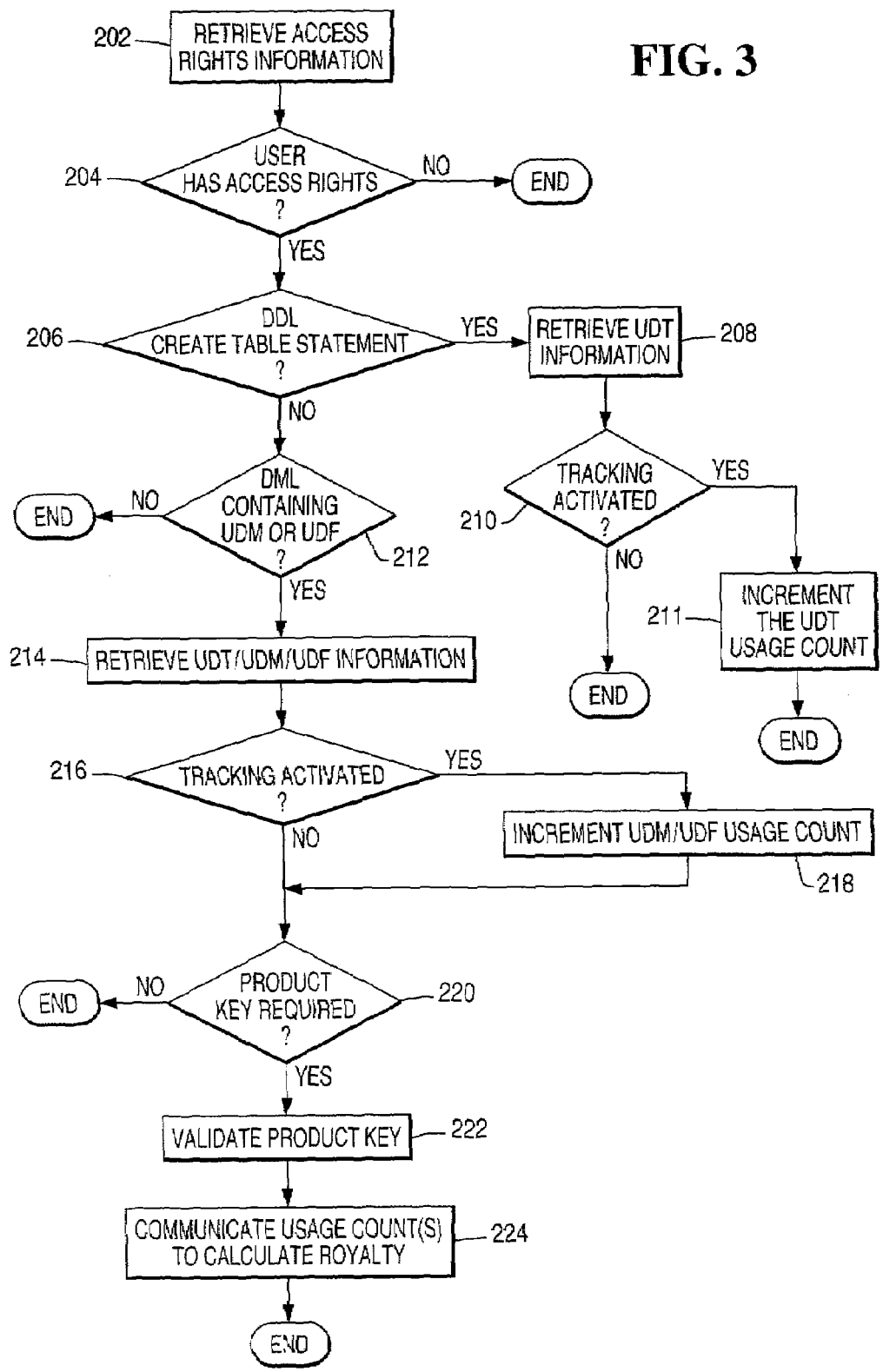
FIG. 3 is a flow diagram of a process of tracking usage of UDTs and associated methods or functions in the database system of FIG. 1, in accordance with an embodiment of the invention.

FIG. 3 shows a flow diagram of a process of tracking usage of UDTs, UDT methods and UDFs, as well as validating authorization codes to determine whether the user or application is authorized to access the UDT, UDT method or UDF.

In response to a request that involves a UDT, UDT method, or UDF, the database system 14 retrieves (at 202) access rights information from the AccessRights table 100 in the data dictionary 50. The database system 14 determines (at 204) if the user has access rights to the UDT, UDT method, and/or UDF. If not, the access is terminated and an error message is returned to the requestor. Note that a similar check can be performed to check access rights to other types of resources in the database system 14.

If the user does have access rights, then the database system 14 determines if a CREATE TABLE DDL statement involving a UDT has been issued (at 206). If so, the tracking routine 30 in the database system 14 retrieves (at 208) UDT information from the UDTInformation table 102 in the data dictionary 50. From information in the Flag column, the tracking routine 30 is able to determine (at 210) if tracking has been activated or not (that is, if the Flag field contains either the ACTIVATE_ACCOUNTING or ACTIVATE_ACCOUNTING_ALL value). If not, then the process ends. However, if tracking has been activated, then the Usage Count field in the UDTInformation table 104 is incremented (at 211).

If the statement received is not a CREATE TABLE DDL statement (as determined at 206), the tracking routine 30 determines (at 212) if the user is executing a DML statement containing either a UDT method or a UDF. If so, information is retrieved (at 214) from the Flag column of the UDF/UDMInformation table 104 to determine if the information contains the ACTIVATE_ACCOUNTING flag. If so, the invoked UDT method or UDF should be tracked. If the DML statement invokes a UDT method, then the associated Flag field is also retrieved from the UDTInformation table 102 to determine if the ACTIVATE_ACCOUNTING_ALL keyword has been turned on. Thus, even if the Flag column in the UDF/UDMInformation table 104 does not contain an ACTIVATE_ACCOUNTING value, tracking of the UDT method is still performed if the Flag field in the UDTInformation table 102 has the ACTIVATE_ACCOUNTING_ALL value.

If tracking has been activated (as determined at 216), the Usage Count field in the UDF/UDMInformation table 104 is incremented (at 218) by the tracking routine 30. Note that access of other resources in the database system 14 can be similarly tracked with respective Usage Count fields.

Next, the database system 14 determines if a product key is required (at 220) based on whether the Product Key column in the UDTInformation table 102 or UDF/UDMInformation table 104 contains a product key. If not, the process ends. However, if a product key is required, then the tracking routine 30 determines if an authorization code is sent with the message invoking the UDT method or UDF. There exists several possibilities on how an authorization code can be provided to validate usage of a function (either a UDT method or a UDF). In the case of the UDF, the product key is passed as a parameter. In the case of a UDT method, the authorization code can either be passed as a parameter to the UDT method, or it can be passed as parameter in a predetermined method or routine, e.g., Verify Key(ProductCode), where ProductCode contains the authorization code. The tracking routine 30 matches the authorization code to the Product Key column value retrieved from the UDTInformation table 102 or UDF/UDMInformation table 104. Instead of just matching the authorization code, another application is to use a Product Key authorization procedure to verify proof-of-purchase or checking of license expiration limits.

Periodically, or in response to a request, the tracking routine 30 communicates (at 224) the tracked usage information (the Usage Count column information in the UDTInformation table 102 and UDF/UDMInformation table 104) to an external system 40 over the data network 12 (FIG. 1). A royalty calculation routine 42 is executable in the external system 40 to calculate a royalty based on the Usage Count information.

Alternatively, the Usage Count information is communicated to a royalty calculation routine 44 executable in the database system 14.

Instructions of the various software routines or modules discussed herein (such as the tracking routine 30, the access modules 22, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A process for use in a database system, comprising:
   receiving a query for data in the database system;
   determining if one or more resources are accessed in response to the query;
   tracking an amount of usage of the accessed one or more resources; and
   storing an indication of the tracked amount of usage.

2. The process of claim 1, further comprising communicating the indication to a routine for calculating a royalty.

3. The process of claim 1, wherein determining if the one or more resources are accessed comprises determining if at least one of a user-defined data type, user-defined data type method, and user-defined function is accessed.

4. The process of claim 1, wherein storing the indication comprises storing the indication in a data dictionary.

5. An article comprising at least one storage medium containing instructions that when executed cause a database system to:
   receive a query for data in the database system;
   determine if one or more resources are accessed in response to the query;
   track an amount of usage of the accessed one or more resources; and
   store an indication of the tracked amount of usage.

6. The article of claim 5, wherein the instructions when executed cause the database system to further communicate the indication to a routine for calculating a royalty.

7. The article of claim 5, wherein the instructions when executed cause the database system to determine if the one or more resources are accessed by determining if at least one of a user-defined data type, user-defined data type method, and user-defined function is accessed.

8. The article of claim 5, wherein the instructions when executed cause the database system to store the indication in a data dictionary.

9. A process for use in a database system, comprising:
   storing data according to a user-defined data type in the database system;
   tracking usage of the user-defined data type; and
   storing an indication of the tracked usage.

10. The process of claim 9, further comprising communicating the indication to a routine for calculating a royalty.

11. The process of claim 9, further comprising providing a flag to indicate whether usage of the user-defined data type is to be tracked.

12. The process of claim 11, further comprising accessing the flag in response to a query for creating a table that contains an attribute according to the user-defined data type.

13. The process of claim 12, further comprising receiving the query, the query comprising a Structured Query Language CREATE TABLE statement.

14. The process of claim 11, wherein providing the flag comprises storing the flag in a table of a data dictionary.

15. The process of claim 14, further comprising:
   storing data according to second user-defined data type; and
   storing a second flag associated with the second user-defined data type in the table to indicate whether to track usage of the second user-defined data type.

16. The process of claim 11, wherein providing the flag comprises providing the flag having a state set to one of at least two values, a first value indicating tracking of usage of the user-defined data type, and a second value indicating tracking of usage of the user-defined data type and methods associated with the user-defined data type.

17. The process of claim 9, further comprising:
providing a method associated with the user-defined data type;
tracking usage of the method; and
storing a second indication of the tracked usage of the method.

18. The process of claim 17, wherein storing the indications comprises storing the indications in a data dictionary.

19. The process of claim 18, wherein storing the indications comprises storing the indications in respective tables in the data dictionary, the tables comprising a first table containing information defining the user-defined data type, and a second table containing information defining the method.

20. The process of claim 17, further comprising:
providing a user-defined function; and
tracking usage of the user-defined function.

21. The process of claim 20, further comprising:
associating an authorization code with at least one of the user-defined data type, method, and user-defined function; and
using the authorization code to determine if access of the at least one user-defined data type, method, and user-defined function is allowed.

22. An article comprising at least one storage medium containing instructions that when executed cause a database system to:
track usage of a user-defined data type object, the user-defined data type object comprising at least one of a user-defined data type attribute and a user-defined data type method; and
store an indication of usage of the user-defined data type object.

23. The article of claim 22, wherein the instructions when executed cause the database system to further communicate the indication to a module for calculating royalty based on the indication of usage.

24. The article of claim 22, wherein the indication comprises a count, and wherein the instructions when executed cause the database system to further increment the count each time a table is created containing the user-defined data type attribute.

25. The article of claim 22, wherein the indication comprises a count, and wherein the instructions when executed cause the database system to further increment the count each time the user-defined data type method is invoked.

26. The article of claim 22, wherein the instructions when executed cause the database system to store the indication in a data dictionary.

27. The article of claim 26, wherein the instructions when executed cause the database system to further provide a flag in the data dictionary to indicate that usage of the user-defined data type object is to be tracked.

28. The article of claim 27, wherein the instructions when executed cause the database system to further access the flag each time a table containing the user-defined data type attribute is created.

29. The article of claim 27, wherein the instructions when executed cause the database system to further access the flag each time the user-defined data type method is invoked.

30. The article of claim 29, wherein the instructions when executed cause the database system to further track usage of a user-defined function.

31. A database system, comprising:
a storage subsystem to store a table; and
a controller adapted to:
create the table containing an attribute according to a user-defined data type; and
update an indication representing usage of the user-defined data type in response to creating the table.

32. The database system of claim 31, wherein the controller is adapted to further:
create a second table containing another attribute according to the user-defined data type, and
update the indication in response to creating the second table.

33. The database system of claim 32, wherein the indication comprises a count incremented by the controller.

34. The database system of claim 31, the storage subsystem to store a data dictionary,
the indication contained in the data dictionary.

35. The database system of claim 34, wherein the data dictionary further contains a flag indicating that the user-defined data type is to be tracked.

36. The database system of claim 31, wherein the controller is adapted to further:
create a second table containing an attribute according to a second user-defined data type, and
update a second indication representing usage of the second user-defined data type in response to creating the second table.

37. The database system of claim 31, further comprising plural access modules to access plural portions of the table in parallel.

38. The database system of claim 31, further comprising a method associated with the user-defined data type,
the controller adapted to track usage of the method.

39. The database system of claim 38, wherein the controller is adapted to track usage of the method by incrementing a count in response to each innovation of the method.

40. The database system of claim 38, further comprising a user-defined function, the controller adapted to track usage of the user-defined function.

* * * * *